Patented Sept. 24, 1940

2,216,020

UNITED STATES PATENT OFFICE

2,216,020

EXTRUDABLE POLYVINYLAL RESINOUS COMPOSITION

Birger W. Nordlander, Schenectady, and Robert E. Burnett, Niskayuna, N. Y., assignors to General Electric Company, a corporation of New York No Drawing. Application August 31, 1937, Serial No. 161,796

6 Claims. (Cl. 260—73)

This invention relates to resinous compositions and particularly to resinous compositions of the class produced by condensing an aldehyde with a product of hydrolysis of a polyvinyl ester. It is specifically directed to an extrusion mix of such resinous compositions, which mix is capable of being extruded upon a conductor as electrical insulation therefor and is so compounded that it can be rendered plastic at elevated temperatures for a period of time sufficient to effect the extrusion of the resinous composition without attendant hardening in the extrusion head or die.

The resinous compositions of the type referred to above are described, generally, in Reissue Patent No. 20,430, Morrison et al., and, as pointed out in said patent, may be produced from various aldehydes and various polyvinyl esters. In the following description of the invention and in the appended claims, this class of resins is designated, generally, as "polyvinylal resins." A polyvinylal resin may be prepared, for instance, as follows:

One hundred parts of a polymerized vinyl acetate is dissolved in 185 parts of glacial acetic acid. To this is added 83 parts of an aqueous solution of formaldehyde, containing 37½ per cent of formaldehyde, and a suitable amount of mineral acid, for example 6.8 parts of concentrated sulfuric acid. All proportions herein given are by weight. Hydrolysis is carried out at about 70° C. in an enameled vessel. Samples of the reaction mixture are removed at suitable intervals of time and analyzed for their formaldehyde content. The results of analyses indicate the extent to which the polyvinyl ester has been converted into polyvinyl formal. When the desired degree of conversion has been effected, a suitable amount of a neutralizing agent, for example 13 parts of concentrated ammonia, is added to the reaction vessel. The neutralized mass is poured as a thin stream into water, whereupon the reaction product is precipitated in the form of threads. The thread-like material is washed with water and dried in a current of warm (60° C.) air. The dried threads are white, or nearly so.

Aldehydes other than formaldehyde may be used in making polyvinylal resins, for example, acetaldehyde, propionic aldehyde, butyric aldehyde, benzaldehyde and the like. Likewise polyvinyl esters other than polyvinyl acetate may be employed, for instance polyvinyl propionate, polyvinyl butyrate and the like. The properties of polyvinylal resins may be varied through a wide range by varying the viscosity and the extent of the hydrolysis of the polyvinyl ester, the amount and the character of the aldehyde reacted with the hydrolyzed vinyl ester, and the character and the amount of acid catalyst used.

It has been found that polyvinylal resins decompose upon heating in air or oxygen, giving off volatile products among which, in the case of polyvinyl formal, formaldehyde, formic acid and other organic acids, carbon dioxide and water have been identified. The decomposition is accompanied by shrinkage and discoloration of the material and also, depending upon time and temperature conditions, by its partial or complete conversion to the insoluble and infusible state.

Rapid conversion of a polyvinylal resin to a hard, infusible state is objectionable during extrusion of the hot, plastic resin on and about, for example, a wire. In such applications the initially plastic mass increases in consistency in the extrusion head, often to the point of hardening of portions thereof as the process proceeds, thereby rendering difficult its extrusion.

In accordance with the present invention the abovementioned difficulties in extruding a polyvinylal resin upon wire or the like are obviated or minimized by incorporating with said resin a relatively small proportion, for example from 0.1 to 2.0 per cent by weight of the whole, of a substance capable of retarding the conversion of the said resin from plastic state to infusible insoluble state during extrusion at an elevated temperature such, for instance, as within the range of 185° to 250° C. For purpose of brevity substances having the described characteristic hereinafter will be referred to as "retarders" or "retarding agents." Any suitable amount of retarder may be incorporated with a polyvinylal resin, but in general no material gain is had with the use of more than 2.0 per cent.

Specific examples of retarders which may be intimately associated with polyvinylal resins in preparing extrudable compositions of this invention are phenolic bodies such as phenol, resorcinol, catechol, hydroquinone, pyrogallol, phloroglucinol, alpha- and beta-naphthol, and the like; substituted phenols such, for instance, as cresols, xylenols, carvacrol, thymol, para-tertiary butyl phenol, para-tertiary amyl phenol, paraphenyl phenol, ortho-hydroxymethyl phenol (saligenin), 2,4-diamyl phenol and the like; aliphatic primary, secondary and tertiary amines such as ethyl, propyl, butyl, amyl, hexyl, heptyl, octyl and higher members of the homologous series, and mixed aliphatic amines such as methyl amyl, ethyl hexyl, iso-propyl butyl amines and the like; substituted aliphatic amines such as mono-, di-, and tri-ethanol amines, and the like; aliphatic poly-amines such as ethylene diamine, tri- and tetra-methylene diamines, and the like; aromatic primary, secondary and tertiary amines such as phenyl, naphthyl, naphthyl phenyl, biphenyl (more correctly designated as the biphenylyl group) amines and substitution products of such amines; mixed amines such as benzyl amine; and combinations of the above-mentioned aromatic and aliphatic amines, for example ethyl naphthyl amine, diphenyl methyl amine and the like.

Retarding agents such as above-described obviate the objectionable effects of oxygen on a polyvinylal resin at elevated extrusion temperatures. It is believed that the advantages accruing from the use of such agents result mainly from their barring oxygen from the points of the resin molecules which are vulnerable to attack by oxygen. In addition these agents may produce a beneficial effect in other ways. For example, when a basic substance such as an amine is used, it may neutralize occluded acidic materials present in polyvinylal resin as commercially prepared and may neutralize any acidic decomposition products of the resin that may be formed. Or, if retarders of either the amino or phenolic types are employed, any aldehydic decomposition products of polyvinylal resin may react with such retarder to form a non-volatile resinous composition which itself has a stabilizing effect upon polyvinylal resin in the same way as do the retarders themselves.

For convenience in preparation, storage and use of extrudable compositions of this invention it is preferred to use retarding agents which either have high boiling characteristics or are solid at normal room temperatures.

The retarder may be incorporated in any suitable manner with polyvinylal resin during its preparation or with the finished resin in solid state. For instance the retarder, if normally a solid, may be dissolved in a suitable volatile solvent therefor. Depending upon the solubility characteristics of the retarder, the solvent employed may be, for example, water, methyl or ethyl alcohol, acetone, ethyl ether, acetal, etc. The retarder then may be deposited from solution on the solid resin. The mass is thereafter heated to remove the solvent. Liquid retarders may be mixed with a diluent of lower boiling point and the diluted solution then may be applied to the solid resin. The diluent is then evaporated. In such ways a more uniform deposition of the retarder on the resin is obtained.

The solvent-free, non-aqueous extrudable compositions of the present invention may contain materials other than a polyvinylal resin and a retarder therefor. For example, it may contain dyes or suitable plasticizers for the polyvinylal resin such, for instance, as dibutyl phthalate, diamyl phthalate, butyl tartrate, tricresyl phosphate, benzyl benzoate, triacetin, tripropionin, etc.

From the foregoing description it will be seen that the present invention provides an extrusion mix (extrudable composition) comprising an extrudable polyvinylal resin normally converting to an insoluble infusible state during extrusion thereof at an elevated temperature and a relatively small proportion of an amine intimately associated with the said resin, which mix is extrudable at an elevated temperature without conversion of the said polyvinylal resin to an insoluble infusible state during extrusion.

The compositions of this invention may be used to advantage in insulating a conductor as described in the co-pending application of Kenneth H. Benton, Serial No. 161,764, filed concurrently herewith, and assigned to the same assignee as the present invention.

In the co-pending application of one of us (Birger W. Nordlander), namely, application Serial No. 149,668, filed June 22, 1937, now Patent No. 2,195,122, is disclosed and claimed a composition of matter comprising the resinous material obtained by condensing formaldehyde with a product of hydrolysis of polyvinyl ester and, in addition thereto, a small amount of ortho-hydroxymethyl phenol (saligenin). The compositions disclosed and claimed in the present application are separate and distinct from the compositions disclosed and claimed in Nordlander application Serial No. 149,668.

What we claim as new and desire to secure by Letters Patent of the United States, is:

1. An extrusion mix comprising an extrudable polyvinylal resin normally converting to an insoluble infusible state during extrusion thereof at an elevated temperature and a relatively small proportion of an amine intimately associated with the said resin, said mix being extrudable at an elevated temperature without conversion of the said resin to an insoluble infusible state during extrusion.

2. An extrudable composition comprising an extrudable polyvinylal resin obtained by condensing formaldehyde with a product of hydrolysis of polyvinyl ester, said resin normally converting to an insoluble infusible state during extrusion thereof at an elevated temperature, and an amine intimately associated with the said resin in an amount corresponding to from 0.1 to 2.0 per cent by weight of the whole, said composition being extrudable at an elevated temperature without conversion of the said resin to an insoluble infusible state during extrusion.

3. An extrudable composition comprising an extrudable polyvinylal resin obtained by condensing formaldehyde with a product of hydrolysis of polyvinyl acetate and normally converting to an insoluble infusible state during extrusion thereof at 185° to 250° C., said resin having incorporated therein a relatively small quantity of an aliphatic amine and said composition being extrudable at 185° to 250° C. without conversion of the said resin to an insoluble infusible state during extrusion at such temperature.

4. An extrusion mix as in claim 1 wherein the amine is a substituted aliphatic amine.

5. An extrudable composition as in claim 3 wherein the amine is triethanol amine.

6. An extrudable composition as in claim 2 wherein the amine is tertiary butyl amine.

BIRGER W. NORDLANDER.
ROBERT E. BURNETT.